US008601290B2

(12) United States Patent
Isaksson et al.

(10) Patent No.: US 8,601,290 B2
(45) Date of Patent: Dec. 3, 2013

(54) DISTRIBUTED POWER SYSTEM PROCESSING FOR COMMUNICATION DEVICE

(75) Inventors: Henrik Isaksson, Torslanda (SE); Sverker Sander, Billdal (SE); Martin Svensson, Gothenburg (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 352 days.

(21) Appl. No.: 13/160,927

(22) Filed: Jun. 15, 2011

(65) Prior Publication Data
US 2012/0311351 A1    Dec. 6, 2012

Related U.S. Application Data (60) Provisional application No. 61/492,977, filed on Jun. 3, 2011.

(51) Int. Cl.
*G06F 1/26* (2006.01)

(52) U.S. Cl.
USPC .......................................... 713/300; 323/282

(58) Field of Classification Search
USPC .......................................... 713/300; 323/282
See application file for complete search history.

(56) References Cited

U.S. PATENT DOCUMENTS 7,249,267 B2 * 7/2007 Chapuis ........................ 713/300
7,730,332 B1 * 6/2010 Templeton .................... 713/300

* cited by examiner

*Primary Examiner* — Thuan Du
(74) *Attorney, Agent, or Firm* — Rothwell, Figg, Ernst & Manbeck, P.C.

(57) ABSTRACT

A system and method for managing processing resources in a communication device having a power unit with distributed processing capability. In one aspect, digital power control processors that are configured to perform power system tasks and signal processing tasks are reconfigured by reallocating the tasks among the processors in order to balance the processing loads.

20 Claims, 9 Drawing Sheets

DISTRIBUTED POWER SYSTEM PROCESSING FOR COMMUNICATION DEVICE

CROSS-REFERENCE TO RELATED APPLICATIONS

The present application claims priority benefit under 35 U.S.C. §119(e) of U.S. Provisional Patent Application No. 61/492,977, entitled "Distributed Power System Processing for Communication Device," filed Jun. 3, 2011, the contents of which are incorporated herein by reference in their entirety.

TECHNICAL FIELD

The present invention relates to a system and method for managing processing resources in a communication device having a power unit.

BACKGROUND

In a conventional power unit, power unit processing tasks are typically executed in hardware dedicated to one or multiple power stages. For example, an alternating current to direct current (AC-DC) converter may be controlled by a software process that is configured to be executed in a processor dedicated to controlling the AC-DC converter. In addition, other power stages, such as a DC-DC converter and/or a point-of-load (POL) DC-DC converter, may respectively be controlled by software processes, each of which is configured to be executed in a respective dedicated processor. This arrangement is maintained in conventional power units, regardless of computational load or available processing power.

What is desired is an improved power unit for use in, among other devices, a communication device.

SUMMARY

Systems and methods for managing processing resources in a device (e.g., communication device) are provided. In one aspect, power control processors that are configured to perform power system tasks are reconfigured by reallocating tasks among the processors in order to balance processing loads. In some embodiments, this advantageous solution is achieved by determining a proportion of the respective processing capacity being used by each of the power control processors, and reallocating the tasks based on the respective proportions.

In one example aspect, a communication device comprises a power unit with distributed processing capability. The power unit comprises an alternating current to direct current (AC-DC) converter configured to convert an AC voltage to a first DC voltage and a first power control processor (e.g., digital processor) configured to control the AC-DC converter. The power unit may also include a direct current to direct current (DC-DC) converter configured to receive the first DC voltage and convert the first DC voltage to a second DC voltage and a second power control digital processor configured to control the DC-DC converter. The power unit may further include a first point-of-load (POL) DC-DC converter configured to receive the second DC voltage, convert the second DC voltage to a third DC voltage, and provide the third DC voltage to a first load; a second point-of-load (POL) DC-DC converter configured to receive the second DC voltage, convert the second DC voltage to a fourth DC voltage, and provide the fourth DC voltage to a second load; and a POL power control digital processor configured to control the first POL DC-DC converter and/or second POL DC-DC converter.

In some embodiments, the first power control digital processor may be further configured to perform (i) a power control loop task used in controlling a voltage converter other than the AC-DC converter or (ii) a power management task or a signal processing task not associated with a process for controlling the AC-DC converter. In some embodiments, the second power control digital processor may be further configured to perform (i) a power control loop task used in controlling a voltage converter other than the DC-DC converter or (ii) a power management task or a signal processing task not associated with a process for controlling the DC-DC converter. In some embodiments, the POL power control digital processor may be further configured to perform (i) a power control loop task used in controlling a voltage converter other than a POL DC-DC converter coupled to the POL power control processor or (ii) a power management task or a signal processing task not associated with a process for controlling a POL DC-DC converter coupled to the POL power control digital processor.

In some embodiments, the communication device may further include an interface for receiving a signal transmitted from another communication device. One or more of the first power control digital processor, the second power control digital processor, or the POL power control digital processor may be further configured to perform a signal processing task for use in processing the received signal. The communication device may further include a communication device interface digital processor configured to process data received via the communication device interface. The communication device interface digital processor may be further configured to perform a power control loop task for use in controlling one or more of: (i) the AC-DC converter, (ii) the DC-DC converter, and (iii) a POL DC-DC converter coupled to the POL power control digital processor.

In some embodiments, the communication device may further include a data bus. Each of the first power control digital processor, the second power control digital processor, and the POL power control digital processor may be connected to the data bus. The communication device may further include an additional digital processor which is connected to the data bus.

The additional digital processor may be configured to perform a controller task for use in configuring one or more of the first power control digital processor, the second power control digital processor, and the POL power control digital processor. The additional digital processor may be further configured to use the controller task to determine a proportion of a respective processing capacity being used by each of the first power control digital processor, the second power control digital processor, the POL power control digital processor, and the additional digital processor, and to configure one or more of the processors by reallocating power system tasks and signal processing tasks based on the determined proportions.

In some embodiments, the additional digital processor may be further configured to use the controller task to allocate a newly added software process to one of the first power control digital processor, the second power control digital processor, the POL power control digital processor, and the additional digital processor. A determination of which one of the processors receives the allocation of the newly added software process may be based on the determined proportions.

In some embodiments, the additional digital processor may be further configured to use the controller task to determine each respective proportion by determining an idle time in the corresponding processor between executions of software processes. Alternatively, the additional digital processor may be further configured to use the controller task to determine each respective proportion by monitoring an amount of allocated memory in the corresponding processor. In another alternative, the additional digital processor may be further configured to use the controller task to determine each respective proportion by monitoring a size of a memory stack residing in the corresponding processor.

In some embodiments, each of the first power control digital processor, the second power control digital processor, and the POL power control digital processor may be one of a central processing unit, a microprocessor, a microcontroller, a digital signal processor, a field-programmable gate array, and an application-specific integrated circuit.

In another aspect, a method for managing processing resources in a communication device is provided. The communication device includes a power unit with distributed processing capability. The power unit may include an AC-DC converter; a first power control digital processor configured to control the AC-DC converter; a DC-DC converter; a second power control digital processor configured to control the DC-DC converter; a first POL DC-DC converter; a second POL DC-DC converter; and a POL power control digital processor. The method may comprise configuring the first power control digital processor to perform (i) a power control loop task used in controlling a voltage converter other than the AC-DC converter or (ii) a power management task or a signal processing task not associated with a process for controlling the AC-DC converter. Alternatively, the method may comprise configuring the second power control digital processor to perform (i) a power control loop task used in controlling a voltage converter other than the DC-DC converter or (ii) a power management task or a signal processing task not associated with a process for controlling the DC-DC converter. In another alternative, the method may comprise configuring the POL power control digital processor to perform (i) a power control loop task used in controlling a voltage converter other than a POL DC-DC converter coupled to the POL power control processor or (ii) a power management task or a signal processing task not associated with a process for controlling a POL DC-DC converter coupled to the POL power control digital processor.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

DETAILED DESCRIPTION

Figure 1:
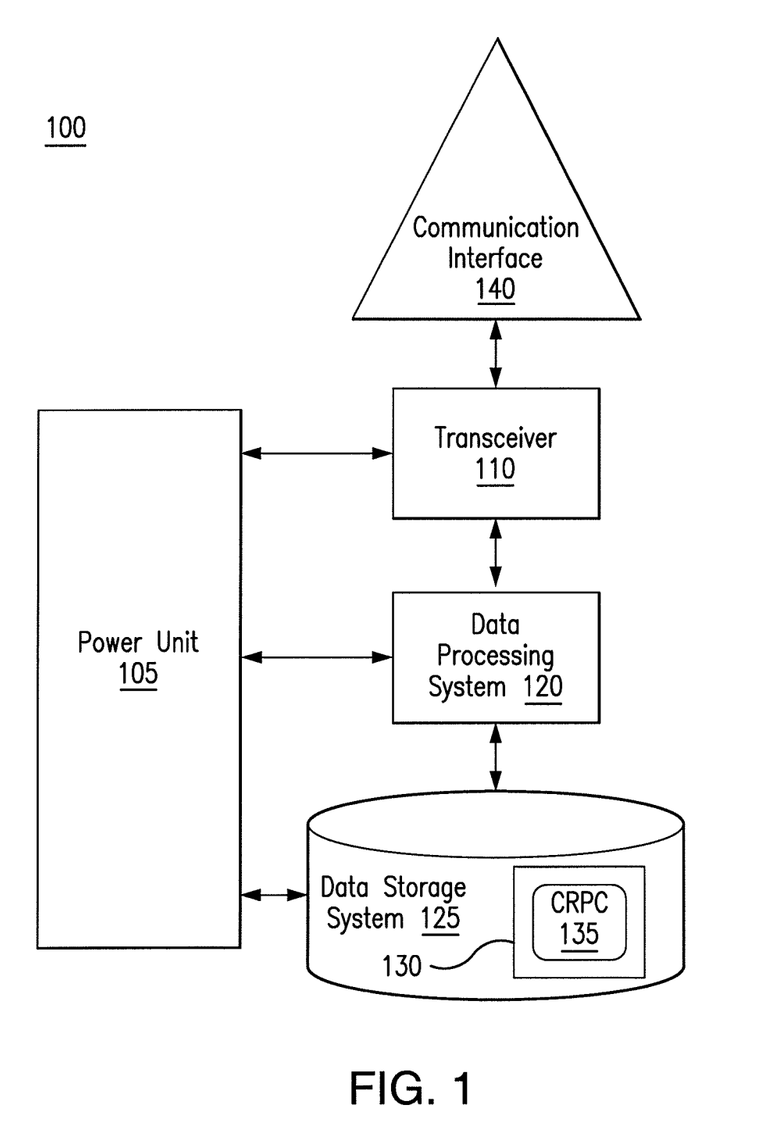
FIG. 1 is a block diagram of a communication device having a power unit with distributed processing capability, in accordance with exemplary embodiments of the disclosed solution.

Referring now to FIG. 1, FIG. 1 illustrates a block diagram of a communication device 100 according to some embodiments. In one exemplary embodiment, the communication device 100 is a base station or other network node for a mobile communication system, such as, for example, a cellular telephone system. In other exemplary embodiments, the communication device 100 may be any device that can be used for communication, such as, for example, a communications server, a router, a network server computer, a laptop or desktop personal computer, a mobile telephone, a personal digital assistant, or a tablet device (e.g., an Apple iPad or Amazon Kindle).

As shown in FIG. 1, the communication device 100 may include: a data processing system 120, which may include one or more microprocessors and/or one or more circuits, such as an application specific integrated circuit (ASIC), Field-programmable gate arrays (FPGAs), etc; a power unit 105; a transceiver 110; a communication interface 140; and a data storage system 125, which may include one or more non-volatile storage devices and/or one or more volatile storage devices (e.g., random access memory (RAM)). In embodiments where data processing system 120 includes a microprocessor, computer readable program code 135 may be stored in a computer readable medium 130, such as, but not limited, to magnetic media (e.g., a hard disk), optical media (e.g., a DVD), memory devices (e.g., random access memory), etc. In some embodiments, computer readable program code 135 is configured such that when executed by a processor, code 135 causes the communication device to perform steps described below (e.g., steps described below with reference to the flow charts shown in FIGS. 4 and 5). In other embodiments, the communication device 100 is configured to perform steps described above without the need for code 135. That is, for example, data processing system 120 may consist merely of one or more ASICs. Hence, the features of the disclosed solution described above may be implemented in hardware and/or software. For example, in particular embodiments, the functional components of the communication device 100 described above may be implemented by data processing system 120 executing computer instructions 135, by data processing system 120 operating independent of any computer instructions 135, or by any suitable combination of hardware and/or software.

Figure 2A:
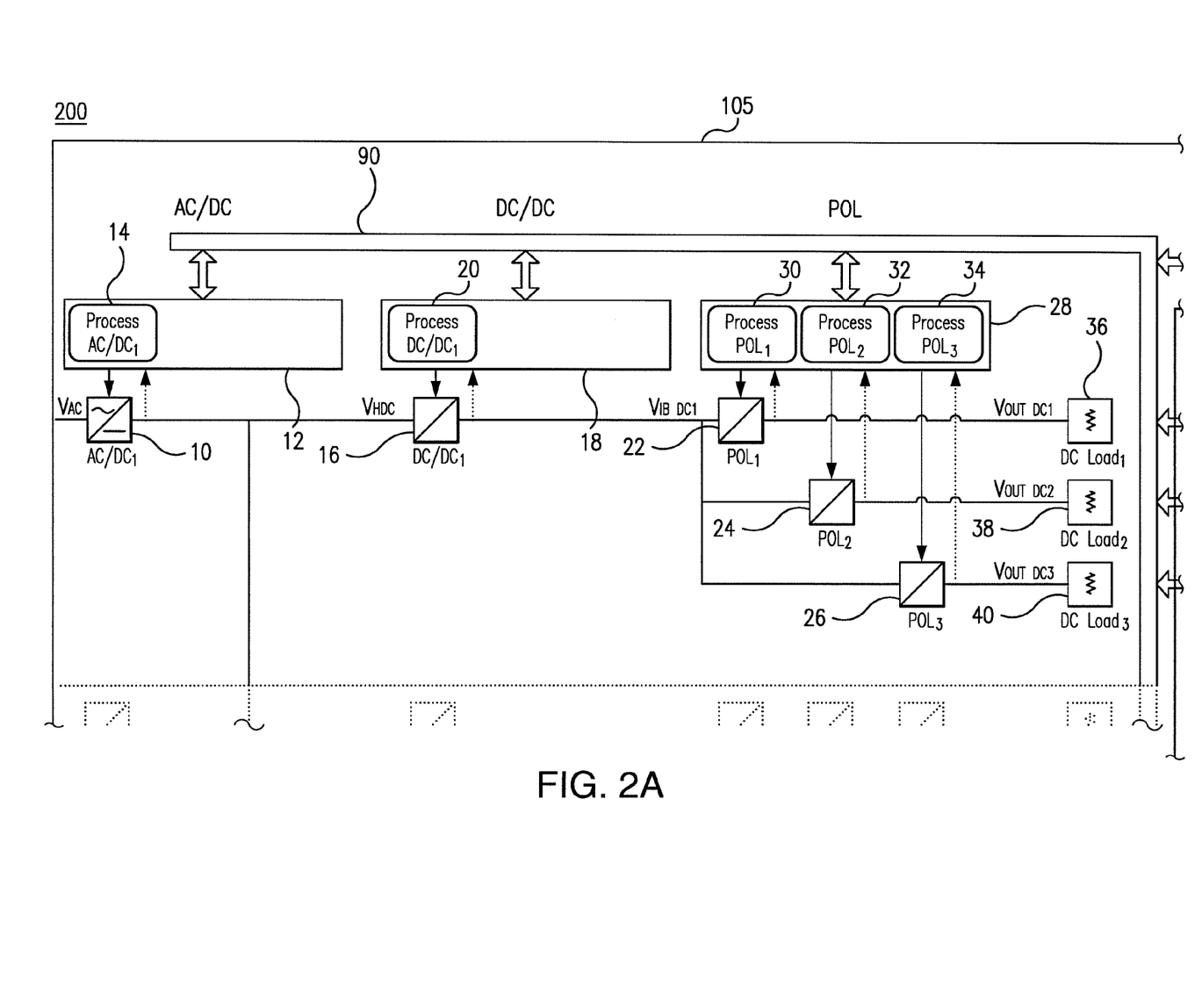
FIGS. 2A, 2B, and 2C are a block diagram of a power unit having multiple power stages with dedicated processing hardware and an exemplary allocation of processing tasks for use in the device of FIG. 1.
Figure 2B:
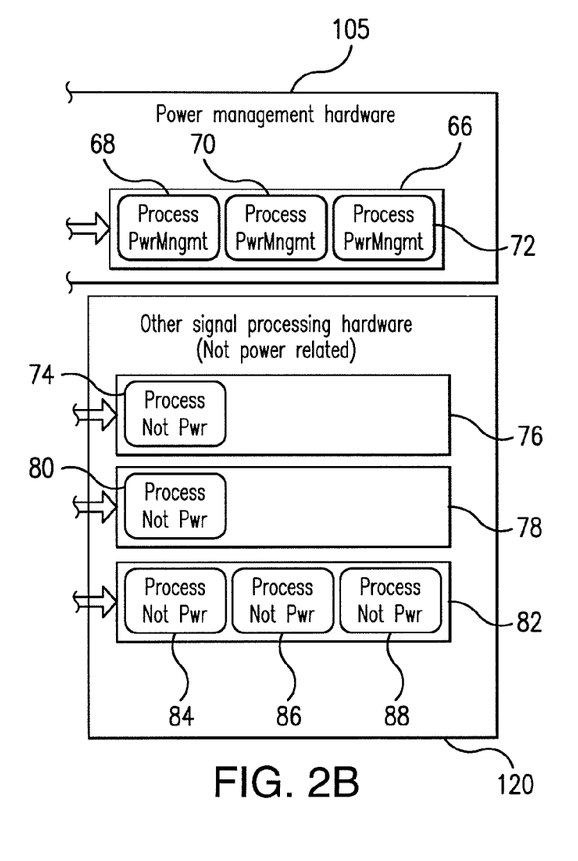
Figure 2C:
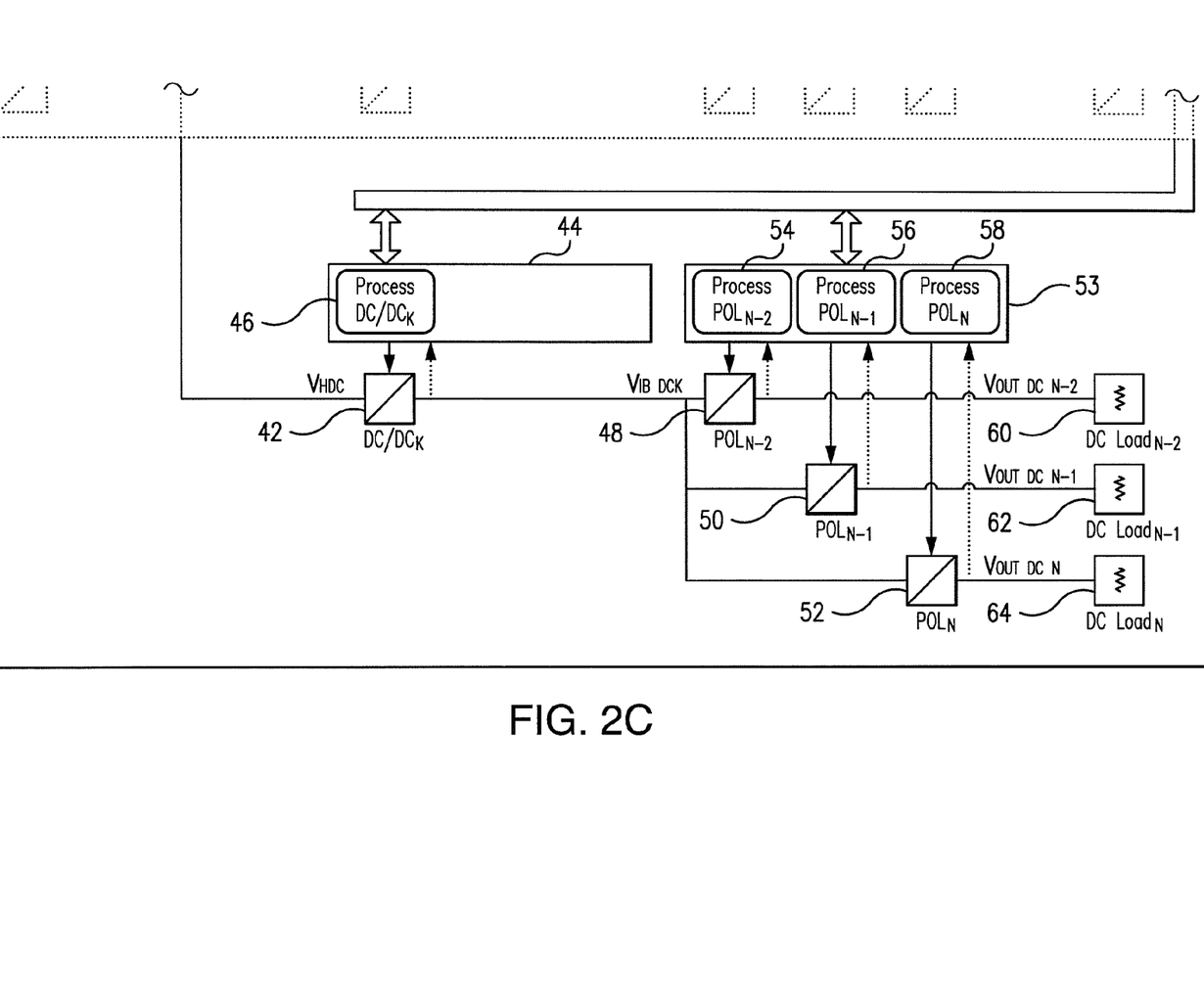

Referring now to FIGS. 2A, 2B, and 2C, a block diagram 200 of a power unit 105 and data processing system 120 having multiple power stages with dedicated processing hardware and an exemplary allocation of processing tasks for use in the communication device 100 of FIG. 1 is shown. The power unit 105 includes a power stage 10 (e.g., an AD-DC converter); a power stage 16 (e.g., a first DC-DC converter); a plurality of power stages 22, 24, 26 (e.g., POL DC-DC converters); a power stage 42 (e.g., a second DC-DC converter); and a plurality of power stages 48, 50, 52 (e.g., POL DC-DC converters). As indicated by the dotted line portion at the bottom of FIG. 2A and the top of FIG. 2C, the power unit 105 can accommodate additional power stages as appropriate for the device being served by the power unit 105.

The AC-DC converter power stage 10 is configured to convert an input AC voltage, for example, 230 VAC, to a first DC voltage, which typically has a relatively high value, for example, −48 VDC, and then delivers first DC voltage to each of the DC-DC converter power stages 16, 42. Each of the DC-DC converter power stages 16, 42 receives the first DC voltage and converts the first DC voltage to a second DC voltage that typically has an intermediate value, for example, +12 VDC. The second DC output voltage from DC-DC converter power stage 16 may or may not be equal to the second DC output voltage from DC-DC converter power stage 42. The second DC voltages are then delivered to the respective plurality of POL DC-DC converter power stages 22, 24, 26 and 48, 50, 52. Each POL DC-DC converter receives the respective second DC voltage and converts the second DC voltage to a third DC voltage that typically has a relatively low value, for example, +1.8 VDC. Once again, each individual POL DC-DC converter may be configured to output a third DC voltage having a value that is unique to that respective POL DC-DC converter. The third DC voltages are delivered to DC power loads 36, 38, 40 and 60, 62, 64. The DC power loads may be any load that is used by the communication device 100, such as, for example, an ASIC, an FPGA, an RF module, or any equivalent thereof.

In the embodiment shown, each power stage is connected to a dedicated power control processor (e.g., digital processor) that is configured to execute software processes for controlling the respective power stage. In some embodiments, the dedicated power control digital processor may be a typical microcontroller, such as, for example, the STMicroelectronics STM32 controller. In other embodiments, the dedicated power control digital processor may a digital power controller, such as, for example, the Texas Instruments UCD9240. The dedicated power control digital processor may be any one of a microprocessor, a microcontroller, a digital signal processor, a field-programmable gate array (FPGA), an application-specific integrated circuit (ASIC), or any other suitable device for executing the software processes required for operation of the power unit 105.

The AC-DC converter power stage 10 is connected to a power control digital processor 12 in which a power control process 14 for the AC-DC converter power stage 10 is executed. The power control process 14 may configure processor 12 to perform a task (e.g., a method) for controlling power stage 10 (e.g., a power control loop task). In some embodiments, a power control loop task may be a task that is used for controlling the output voltage and/or output current of the power stage and/or internal power stage voltages and/or currents. The power control process 14 may also include performance of a power management task for turning off the power or switching to a low-power state when the AC-DC converter power stage 10 is inactive. The AC-DC converter power stage 10 is configured to transmit signals (e.g., analog signals) to the processor 12, and the processor 12 is configured to transmit pulse-width modulation (PWM) signals to the power stage 10. The PWM signals are used to maintain a constant output voltage regardless of load changes, temperature variations, component conditions, and the like by controlling the duty cycle of the pulses.

Similarly, the DC-DC converter power stage 16 is connected to a power control digital processor 18 in which a power control process 20 for the AC-DC converter power stage 16 is executed, and the DC-DC converter power stage 42 is connected to a power control digital processor 44 in which a power control process 46 for the DC-DC converter power stage 42 is executed. The DC-DC converter power stages 16, 42 are configured to transmit signals to the respective processors 18, 44, and the processors 18, 44 are configured to transmit pulse-width modulation (PWM) signals to the respective power stages 16, 42.

Each of the POL DC-DC converter power stages 22, 24, 26 is connected to a POL power control digital processor 28, which executes power control processes 30, 32, 34 for each of the respective POL DC-DC converter power stages 22, 24, 26. Each of the respective POL DC-DC converter power stages 22, 24, 26 is configured to transmit signals to the processor 28, and the processor 28 is configured to transmit pulse-width modulation (PWM) signals to the respective power stages 22, 24, 26. Similarly, each of the POL DC-DC converter power stages 48, 50, 52 is connected to a POL power control digital processor 53, which executes power control processes 54, 56, 58 for each of the respective POL DC-DC converter power stages 48, 50, 52. Each of the respective POL DC-DC converter power stages 48, 50, 52 is configured to transmit signals to the processor 53, and the processor 53 is configured to transmit pulse-width modulation (PWM) signals to the respective power stages 48, 50, 52.

The processes executed by the processors are generally software processes that are designed to perform a particular task required by the communication device 100. The tasks may include output voltage control or management tasks and non-power related tasks such as signal processing tasks. In some embodiments, the tasks may include, for example, a monitoring process, a measuring process, a data calculation process, a loop regulation process, and/or a system transfer calculation process. In some embodiments, the tasks may include one or more signal processing tasks that are used to process a signal received by interface 140, such as, for example, a baseband filtering process, a channel decoding process, and/or a digital predistortion process. In some embodiments, the interface 140 may include an antenna or an antenna array. Examples of processes that require real-time computing include DC-DC converter output voltage feedback loop regulation and over-current protection of power stages. In these examples, the calculation result is required after a specific number of data bus clock cycles. Examples of processes having a lower priority include power management functions as logging of output voltages and temperature alarms. These processes are allowed to be executed during a much larger number of data bus clock cycles.

Each of the processors 12, 18, 28, 44, 53 is connected to a digital data bus 90, which enables communication between the processors. The bus 90 is selected based on the bandwidth required by the communication device 100. In some embodiments, the following buses may be suitable selections: For a bandwidth requirement in the 100 kHz-400 kHz range, an I20 bus may be used. For a bandwidth requirement of approximately 1 Mb/s, a CAN bus may be used. For a bandwidth requirement of up to 3 Mb/s, an RS232 bus, an RS422 bus, or an RS 485 bus may be used. For a bandwidth requirement that may exceed 10 Mb/s, a Serial Peripheral Interface (SPI) bus may be used. For bandwidths on the order of 1 Gb/s, a Peripheral Component Interconnect Express (PCI Express, or PCIe) bus may be used.

The power unit 105 also includes power control digital processor 66 and is connected to data processing system 120, which includes signal processing digital processors 76, 78, 82, all of which are also connected to the digital data bus 90 and in communication with processors 12, 18, 28, 44, and 53.

Processor 66 is configured to execute power management processes 68, 70, 72. Processor 66 may also be configured to execute a task handler process as described below, although such a process may be executed by any of processors 12, 18, 28, 44, 53, 66, 76, 78, or 82. Processor 76 is configured to execute non-power related process 74. Processor 76 is configured to execute non-power related process 80. Processor 82 is configured to execute non-power related processes 84, 86, 88, such as, for example, processes that process a signal received via interface 140.

Figure 3A:
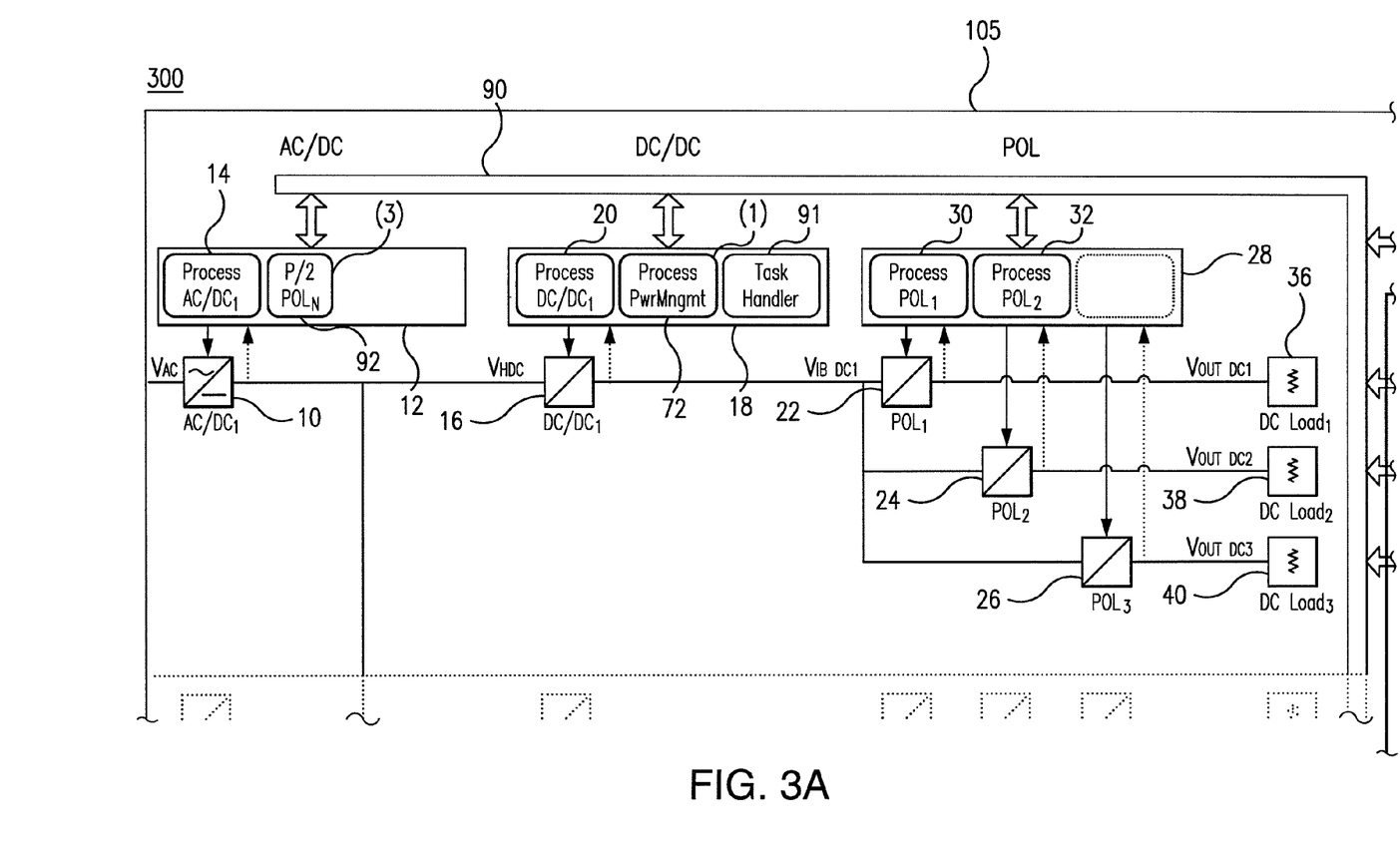
FIGS. 3A, 3B, and 3C are a block diagram of the power unit of FIG. 2 in which the processing tasks have been reallocated in accordance with exemplary embodiments of the disclosed solution.
Figure 3B:
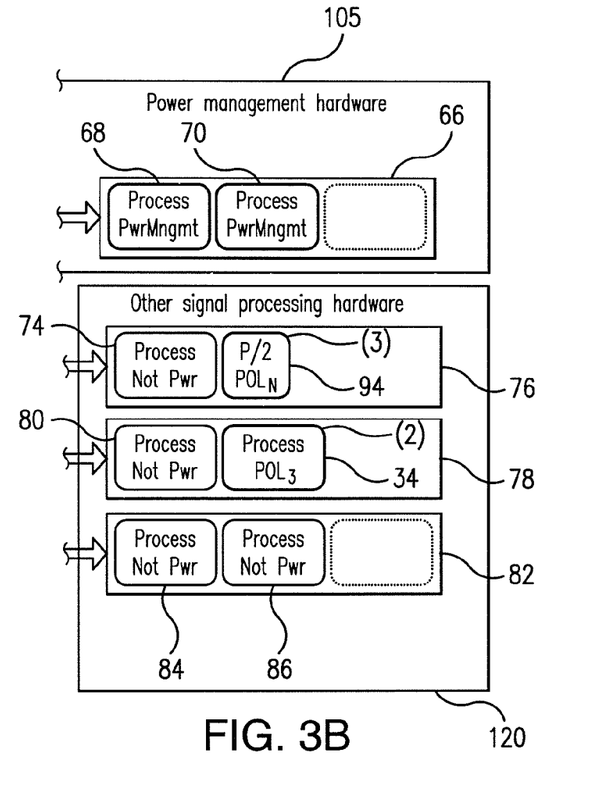
Figure 3C:
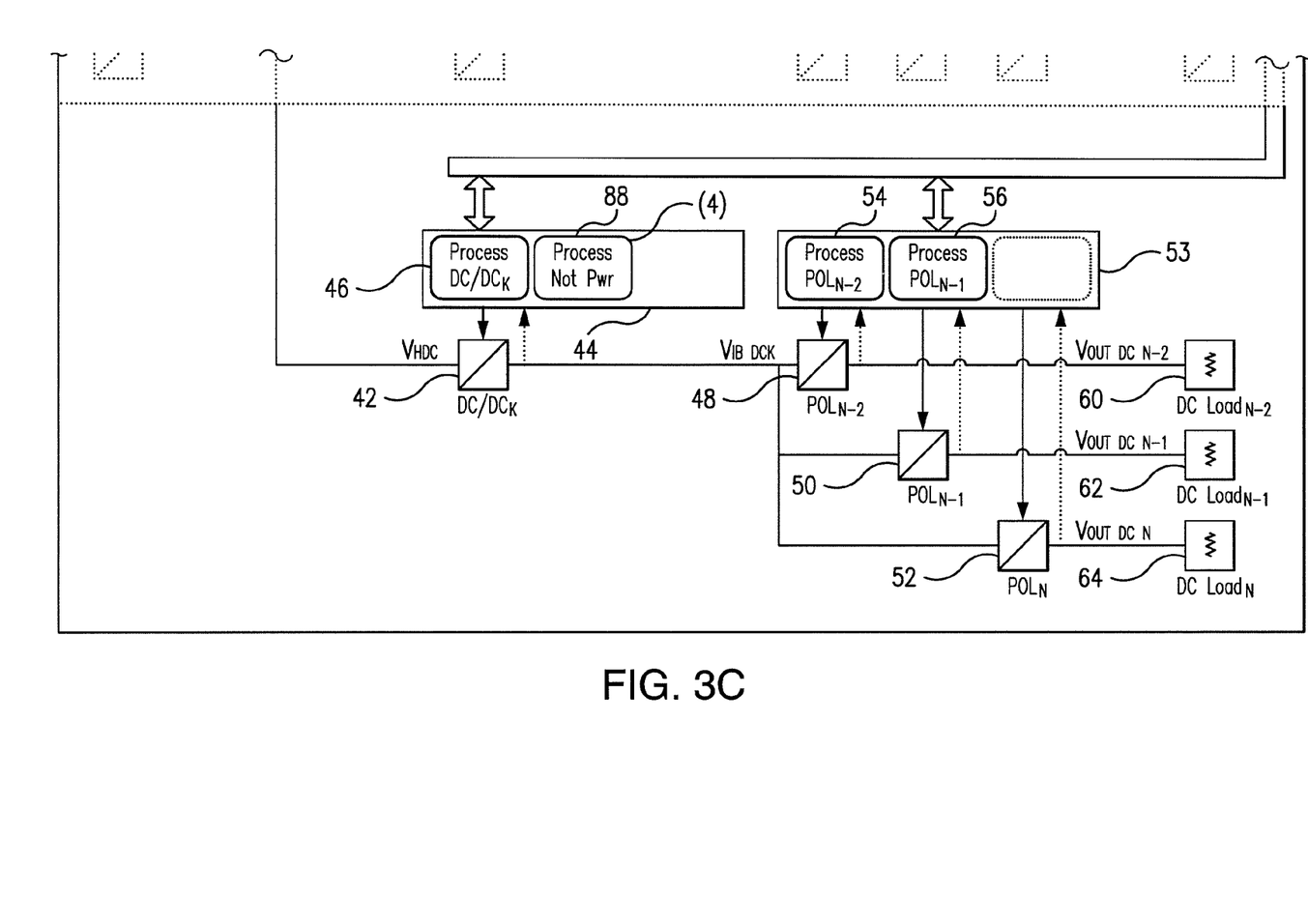

Referring now to FIGS. 3A, 3B, and 3C, a block diagram 300 of power unit 105 and data processing system 120 is shown. Power unit 105 and data processing system 120 have the same hardware configuration as shown in FIGS. 2A, 2B, and 2C; however, some of the software processes have been reallocated to different processors, in accordance with an exemplary embodiment of the disclosed solution. Power management process 72 has been reallocated from processor 66 to processor 18. POL power control process 34 has been reallocated from processor 28 to processor 78. POL power control process 58 has been divided into subprocesses 92 and 94, and subprocess 92 has been allocated to processor 12, and subprocess 94 has been allocated to processor 76. Non-power related process 88 has been reallocated to processor 44. A task handler process 91 has been allocated to processor 18.

Accordingly, some of the processors that have previously been used as dedicated hardware for a corresponding converter are now being used to execute processes for other hardware elements of power unit 105 and/or data processing system 120. In this manner, the computational loads can be distributed in a balanced manner, if desired, and the available digital signal processing power can be used more efficiently. Power system signal processing tasks may be distributed among computational resources. In some embodiments, some software processes may be divided into two or more subprocesses and distributed among processors. Spare computational resources, originally dedicated for power system tasks or not, may be utilized.

In some embodiments, the task handler process 91 (also referred to herein as a "controller task") may be used to distribute software processes among the processors. The task handler process 91 may include steps for determining a proportion of a respective processing capacity that is being used by each processor, and then configuring the processors by reallocating the software processes based on the determined proportions. In the event that it is desired to add a new software process to the power unit 105 and/or data processing system 120, the determined proportions may be used to allocate the new software process to a processor that is determined to have a greater amount of available processing capacity.

In some embodiments, the determination of the respective processing capacities may be accomplished by determining an idle time in each corresponding processor between executions of software processes. In some embodiments, the determination of the respective processing capacities may be accomplished by monitoring an amount of allocated memory (e.g., random-access memory (RAM)) in each corresponding processor. In some embodiments, the determination of the respective processing capacities may be accomplished by monitoring a size of the memory stack in each corresponding processor.

In some embodiments, processing tasks may be dynamically distributed, i.e., transferred from one processor to another processor during operation, depending on computational loads or available signal processing hardware. Distribution of processes may also include priority information, showing in which order or how fast they should be calculated.

In some embodiments, new software processes may be added to existing power stages without consideration of local signal processing limitations. In some embodiments, complex algorithms, e.g., algorithms for power system efficiency optimization, may be realized without consideration of local signal processing limitations. In some embodiments, spare computational resources may be utilized to minimize the amount of signal processing hardware in an electronic system.

Figure 4:
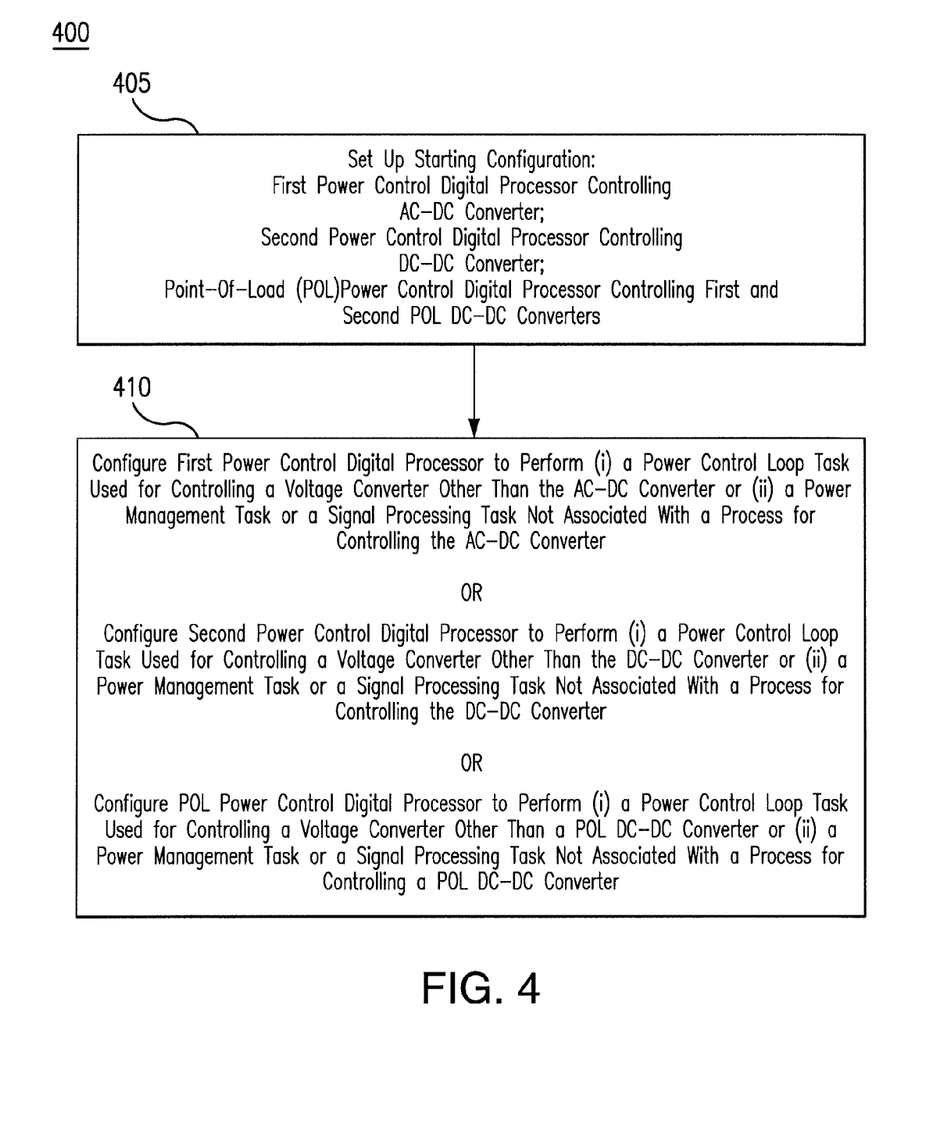
FIG. 4 is a flow chart illustrating a method for managing processing resources in a communication device, in accordance with exemplary embodiments of the disclosed solution.

Referring now to FIG. 4, a flow chart illustrates a process 400 for managing processing resources in a communication device that includes a power unit with distributed processing capability, in accordance with an exemplary embodiment. First, at 405, the starting configuration is set up. The starting configuration includes an AC-DC converter that is controlled by a first power control digital processor; a DC-DC converter that is controlled by a second power control digital processor; and first and second POL DC-DC converters that are both controlled by a POL power control digital processor.

At 410, at least one of three alternative steps is performed. In the first alternative, the first power control digital processor is configured to perform either (i) a power control loop task used for controlling a voltage converter other than the AC-DC converter or (ii) a power management task or a signal processing task not associated with a process for controlling the AC-DC converter. In the second alternative, the second power control digital processor is configured to perform either (i) a power control loop task used for controlling a voltage converter other than the DC-DC converter or (ii) a power management task or a signal processing task not associated with a process for controlling the DC-DC converter. In the third alternative, the POL power control digital processor is configured to perform either (i) a power control loop task used for controlling a voltage converter other than one of the POL DC-DC converters or (ii) a power management task or a signal processing task not associated with a process for controlling either one of the POL DC-DC converters.

Figure 5:
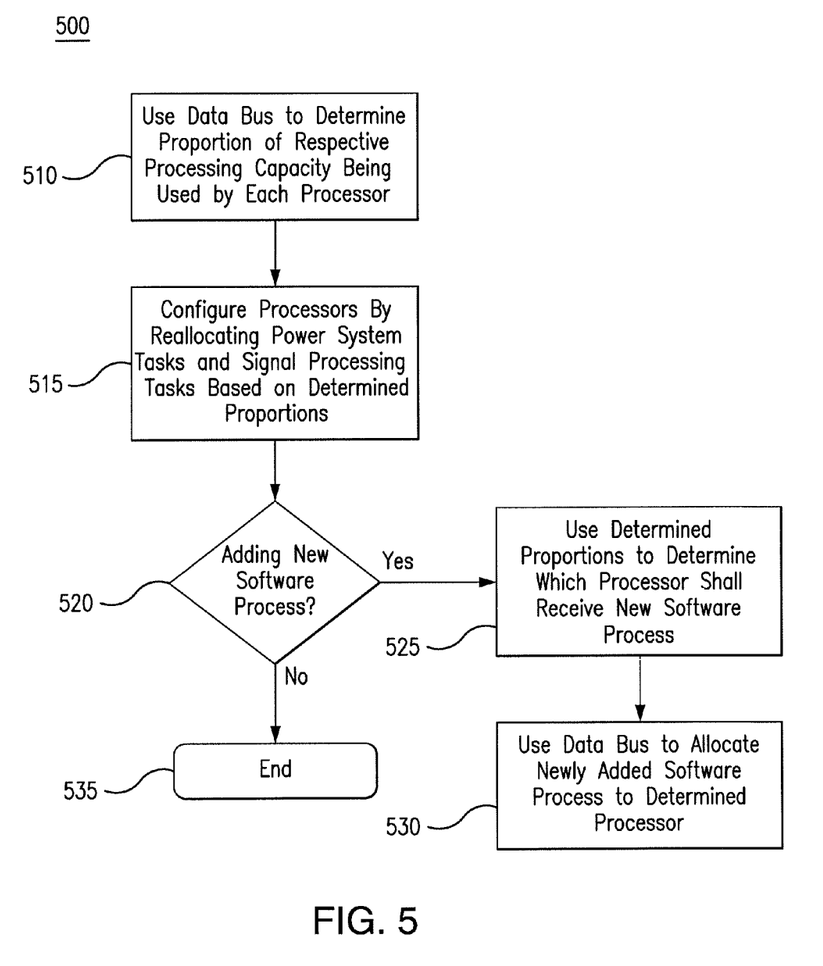
FIG. 5 is a flow chart illustrating a method for reallocating a distribution of tasks among processors based on respective determined proportions of processing capacity being used by the respective processors, in accordance with exemplary embodiments of the disclosed solution.

Referring now to FIG. 5, a flow chart illustrating a process 500 for managing processing resources in a communication device that includes a power unit with distributed processing capability, in accordance with exemplary embodiments of the disclosed solution, is shown. First, at 510, a digital data bus is used to determine a proportion of the respective processing capacity that is being used by each respective processor. Next, at 515, the processors are configured by reallocating power system tasks and signal processing tasks based on the determined proportions.

At 520, a determination is made as to whether a new software process is being added to the system. If no new software process is being added, then the process 500 ends at 535. If a new software process is being added, then at 525, the determined proportions are used to determine which processor is to receive the new software process. Then, at 530, the data bus is used to allocate the newly added process to the determined processor.

While various embodiments have been described above, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

What is claimed is:

1. A communication device comprising a power unit with distributed processing capability, the power unit comprising:
an alternating current to direct current (AC-DC) converter configured to convert an AC voltage to a first DC voltage;
a first power control digital processor configured to control the AC-DC converter;
a direct current to direct current (DC-DC) converter configured to receive the first DC voltage and convert the first DC voltage to a second DC voltage;
a second power control digital processor configured to control the DC-DC converter;
a first point-of-load (POL) DC-DC converter configured to receive the second DC voltage, convert the second DC voltage to a third DC voltage, and provide the third DC voltage to a first load;
a second point-of-load (POL) DC-DC converter configured to receive the second DC voltage, convert the second DC voltage to a fourth DC voltage, and provide the fourth DC voltage to a second load; and
a POL power control digital processor configured to digitally control the first POL DC-DC converter and/or second POL DC-DC converter; wherein
(a) the first power control digital processor is further configured to perform (i) a power control loop task used in controlling a voltage converter other than the AC-DC converter or (ii) a power management task or a signal processing task not associated with a process for controlling the AC-DC converter,
(b) the second power control digital processor is further configured to perform (i) a power control loop task used in controlling a voltage converter other than the DC-DC converter or (ii) a power management task or a signal processing task not associated with a process for controlling the DC-DC converter, or
(c) the POL power control digital processor is further configured to perform (i) a power control loop task used in controlling a voltage converter other than a POL DC-DC converter coupled to the POL power control processor or (ii) a power management task or a signal processing task not associated with a process for controlling a POL DC-DC converter coupled to the POL power control digital processor.

2. The communication device of claim 1, further comprising a communication device interface for receiving a transmitted signal, wherein
(a) the first power control digital processor is further configured to perform a signal processing task for use in processing the transmitted signal received by the communication device interface,
(b) the second power control digital processor is further configured to perform a signal processing task for use in processing the received signal, or
(c) the POL power control digital processor is further configured to perform a signal processing task for use in processing the received signal.

3. The communication device of claim 2, further comprising:
a communication device interface digital processor configured to process data received via the communication device interface, wherein
the communication device interface digital processor is further configured to perform a power control loop task for use in controlling one or more of: (i) the AC-DC converter, (ii) the DC-DC converter, and (iii) a POL DC-DC converter coupled to the POL power control digital processor.

4. The communication device of claim 1, further comprising:
a data bus, wherein each of the first power control digital processor, the second power control digital processor, and the POL power control digital processor is connected to the data bus.

5. The communication device of claim 4, further comprising:
an additional digital processor, connected to the data bus, configured to perform a controller task for use in configuring one or more of the first power control digital processor, the second power control digital processor, and the POL power control digital processor.

6. The communication device of claim 5, wherein the additional digital processor is further configured to:
use the controller task to determine a proportion of a respective processing capacity being used by each of the first power control digital processor, the second power control digital processor, the POL power control digital processor, and the additional digital processor, and
configure one or more of the processors by reallocating power system tasks and signal processing tasks based on the determined proportions.

7. The communication device of claim 6, wherein the additional digital processor is further configured to use the controller task to allocate a newly added software process to one of the first power control digital processor, the second power control digital processor, the POL power control digital processor, and the additional digital processor, wherein a determination of which one of the processors receives the allocation of the newly added software process is based on the determined proportions.

8. The communication device of claim 6, wherein the additional digital processor is further configured to use the controller task to determine each respective proportion by determining an idle time in the corresponding processor between executions of software processes.

9. The communication device of claim 6, wherein the additional digital processor is further configured to use the controller task to determine each respective proportion by monitoring an amount of allocated memory in the corresponding processor.

10. The communication device of claim 6, wherein the additional digital processor is further configured to use the controller task to determine each respective proportion by monitoring a size of a memory stack residing in the corresponding processor.

11. The communication device of claim 1, wherein each of the first power control digital processor, the second power control digital processor, and the POL power control digital processor is selected from the group consisting of a central processing unit, a microprocessor, a microcontroller, a digital signal processor, a field-programmable gate array, and an application-specific integrated circuit.

12. A method for managing processing resources in a communication device, the communication device comprising a power unit with distributed processing capability, wherein the power unit includes:

an alternating current to direct current (AC-DC) converter configured to convert an AC voltage to a first DC voltage;

a first power control digital processor configured to control the AC-DC converter;

a direct current to direct current (DC-DC) converter configured to receive the first DC voltage and convert the first DC voltage to a second DC voltage;

a second power control digital processor configured to control the DC-DC converter;

a first point-of-load (POL) DC-DC converter configured to receive the second DC voltage, convert the second DC voltage to a third DC voltage, and provide the third DC voltage to a first load;

a second point-of-load (POL) DC-DC converter configured to receive the second DC voltage, convert the second DC voltage to a fourth DC voltage, and provide the fourth DC voltage to a second load; and a POL power control digital processor configured to control the first POL DC-DC converter and/or second POL DC-DC converter, the method comprising:

(a) configuring the first power control digital processor to perform (i) a power control loop task used in controlling a voltage converter other than the AC-DC converter or (ii) a power management task or a signal processing task not associated with a process for controlling the AC-DC converter, (b) configuring the second power control digital processor to perform (i) a power control loop task used in controlling a voltage converter other than the DC-DC converter or (ii) a power management task or a signal processing task not associated with a process for controlling the DC-DC converter, or (c) configuring the POL power control digital processor to perform (i) a power control loop task used in controlling a voltage converter other than a POL DC-DC converter coupled to the POL power control processor or (ii) a power management task or a signal processing task not associated with a process for controlling a POL DC-DC converter coupled to the POL power control digital processor.

13. The method of claim 12, wherein the communication device further comprises a communication device interface for receiving a signal, and the method further comprises:

(a) configuring the first power control digital processor to perform a signal processing task for use in processing the received signal, (b) configuring the second power control digital processor to perform a signal processing task for use in processing the received signal, or (c) configuring the POL power control digital processor to perform a signal processing task for use in processing the received signal.

14. The method of claim 13, wherein the communication device further comprises a communication device interface digital processor configured to process data received via the communication device interface, and the method further comprises:

configuring the communication device interface digital processor to perform a power control loop task for use in controlling one or more of: (i) the AC-DC converter, (ii) the DC-DC converter, and (iii) a POL DC-DC converter coupled to the POL power control digital processor.

15. The method of claim 12, wherein the communication device further comprises a data bus connected to each of the first power control digital processor, the second power control digital processor, and the POL power control digital processor, and an additional digital processor connected to the data bus, and the method further comprises:

using the additional digital processor to perform a controller task for use in configuring each of the first power control digital processor, the second power control digital processor, and the POL power control digital processor.

16. The method of claim 15, wherein the step of using the additional digital processor to perform a controller task further comprises:

determining a proportion of a respective processing capacity being used by each of the first power control digital processor, the second power control digital processor, the POL power control digital processor, and the additional digital processor, and configuring each of the processors by reallocating power system tasks and signal processing tasks among the processors based on the determined proportions.

17. The method of claim 16, wherein the step of using the additional digital processor to perform a controller task further comprises:

allocating a newly added software process to one of the first power control digital processor, the second power control digital processor, the POL power control digital processor, and the additional digital processor, wherein a determination of which one of the processors receives the allocation of the newly added software process is based on the determined proportions.

18. The method of claim 16, wherein the step of determining each respective proportion further comprises determining an idle time in the corresponding processor between executions of software processes.

19. The method of claim 16, wherein the step of determining each respective proportion further comprises monitoring an amount of allocated memory in the corresponding processor.

20. The method of claim 16, wherein the step of determining each respective proportion further comprises monitoring a size of a memory stack residing in the corresponding processor.

* * * * *

UNITED STATES PATENT AND TRADEMARK OFFICE
CERTIFICATE OF CORRECTION

PATENT NO. : 8,601,290 B2  
APPLICATION NO. : 13/160927  
DATED : December 3, 2013  
INVENTOR(S) : Isaksson et al.

Page 1 of 1

It is certified that error appears in the above-identified patent and that said Letters Patent is hereby corrected as shown below:

In the Specification

In Column 6, Line 54, delete "an 120" and insert -- an I2C --, therefor.

Signed and Sealed this  
Fifteenth Day of July, 2014

Michelle K. Lee  
*Deputy Director of the United States Patent and Trademark Office*